(12) United States Patent
Häntzschel et al.

(10) Patent No.: US 10,500,736 B2
(45) Date of Patent: Dec. 10, 2019

(54) ASSEMBLY TOOL, ASSEMBLY DEVICE AND ASSEMBLY METHOD

(71) Applicant: KUKA SYSTEMS GMBH, Augsburg (DE)

(72) Inventors: Jörg Häntzschel, Augsburg (DE); Norbert Strobl, Rehling (DE)

(73) Assignee: KUKA SYSTEMS GMBH, Augsburg (DE)

( * ) Notice: Subject to any disclaimer, the term of this patent is extended or adjusted under 35 U.S.C. 154(b) by 423 days.

(21) Appl. No.: 15/122,817

(22) PCT Filed: Mar. 5, 2015

(86) PCT No.: PCT/EP2015/054557
§ 371 (c)(1),
(2) Date: Aug. 31, 2016

(87) PCT Pub. No.: WO2015/132316
PCT Pub. Date: Sep. 11, 2015

(65) Prior Publication Data
US 2017/0066143 A1    Mar. 9, 2017

(30) Foreign Application Priority Data

Mar. 6, 2014 (DE) .................. 20 2014 101 000

(51) Int. Cl.
*B25J 15/06* (2006.01)
*B23P 19/04* (2006.01)
(Continued)

(52) U.S. Cl.
CPC .......... *B25J 15/0616* (2013.01); *B23P 19/04* (2013.01); *B25J 15/0066* (2013.01); *B29C 65/18* (2013.01); *B29C 65/7847* (2013.01); *B29C 66/7212* (2013.01); *B29C 66/865* (2013.01); *B29C 66/9121* (2013.01); *B29C 66/91421* (2013.01);
(Continued)

(58) Field of Classification Search
CPC ...... B25J 15/0616; B25J 15/0066; B64F 5/10; B29C 66/91421; B29C 66/9231; B29C 66/865; B29C 66/7212; B29C 66/9241; B29C 66/9121; B29C 65/18; B29C 65/7847; B23P 19/04
See application file for complete search history.

(56) References Cited

U.S. PATENT DOCUMENTS

| 2014/0182479 A1* | 7/2014 | Hafenrichter | B64F 5/60 105/30 |
| 2014/0263934 A1* | 9/2014 | Buttrick, Jr. | B25J 5/04 248/647 |

FOREIGN PATENT DOCUMENTS

| DE | 10 2007 028 581 A1 | 12/2008 |
| DE | 60 2004 012 823 T2 | 4/2009 |

(Continued)

*Primary Examiner* — Moshe Wilensky
(74) *Attorney, Agent, or Firm* — McGlew and Tuttle, P.C.

(57) ABSTRACT

A joining tool (7), a joining device (2) equipped therewith and a joining method for joining stringers (9) to flexible workpieces (8) are provided. A plurality of industrial robots (3 to 6) are equipped with the joining tools (7) and handle and join the stringer (9) jointly. The joining tools (7) are heated and grip the stringer (9) via a gripper tool (25) on the upper face (30) of the structural unit, using a controlled suction gripper (26), a heated counter-holder (29), which is arranged next to the gripper tool, likewise acting upon the upper face (30) of the structural unit.

20 Claims, 7 Drawing Sheets

(51) Int. Cl.

| | | |
|---|---|---|
| *B25J 15/00* | (2006.01) | |
| *B29C 65/18* | (2006.01) | |
| *B29C 65/78* | (2006.01) | |
| *B29C 65/00* | (2006.01) | |
| *B64F 5/10* | (2017.01) | |
| *B29L 31/30* | (2006.01) | |
| *B29K 105/06* | (2006.01) | |
| *B29K 307/04* | (2006.01) | |

(52) U.S. Cl.
CPC ...... *B29C 66/9231* (2013.01); *B29C 66/9241* (2013.01); *B64F 5/10* (2017.01); *B23P 2700/01* (2013.01); *B29C 65/7838* (2013.01); *B29C 66/112* (2013.01); *B29C 66/131* (2013.01); *B29C 66/21* (2013.01); *B29C 66/532* (2013.01); *B29C 66/543* (2013.01); *B29C 66/545* (2013.01); *B29C 66/721* (2013.01); *B29C 66/863* (2013.01); *B29C 66/9131* (2013.01); *B29K 2105/06* (2013.01); *B29K 2307/04* (2013.01); *B29L 2031/3082* (2013.01)

(56) References Cited

FOREIGN PATENT DOCUMENTS

| | | |
|---|---|---|
| DE | 10 2008 041190 A1 | 3/2010 |
| DE | 10 2011 114 015 A1 | 12/2012 |
| EP | 2 388 194 A2 | 11/2011 |
| EP | 2 388 194 A3 | 6/2012 |
| EP | 2 596 904 A1 | 5/2013 |

\* cited by examiner

ASSEMBLY TOOL, ASSEMBLY DEVICE AND ASSEMBLY METHOD

CROSS REFERENCE TO RELATED APPLICATIONS

This application is a United States National Phase Application of International Application PCT/EP2015/054557 filed Mar. 5, 2015 and claims the benefit of priority under 35 U.S.C. § 119 of German Application 20 2014 101 000.9 filed Mar. 6, 2014, the entire contents of which are incorporated herein by reference.

FIELD OF THE INVENTION

The present invention pertains to an assembly tool for assembling preferably oblong components, especially stringers, on flexible workpieces, especially surface structures, with a correct fit, wherein the assembly tool is heatable and has a connection for an industrial robot as well as a gripping tool for a component. The present invention pertains to an assembly device with the assembly tool and an assembly method with the with the assembly tool.

BACKGROUND OF THE INVENTION

It is known from practice in the manufacture of aircraft that stringers are mounted manually on flexible surface structures, especially on flexible skins of aircraft parts.

EP 2 388 194 A2 and EP 2 596 904 A1 show a robot-guided assembly tool (also known as a joining tool) and an assembly device (also known as a joining device) with a plurality of industrial robots for assembling (joining) stringers in an automated manner on the skin of an aircraft. The assembly tool has a gripper, guide and pressing rollers as well as a heating device, wherein the gripper first grips into the end-face opening of the profiled stringer and releases the stringer after the latter has been placed on the skin of the aircraft. The industrial robot subsequently moves the assembly tool continuously along the stringer, while it is rolling on the stringer with the rotating guide and pressing rollers.

SUMMARY OF THE INVENTION

An object of the present invention is to further improve the assembly technique.

This object is accomplished by the present invention. The assembly technique (joining technique) being claimed, i.e., the assembly tool (joining tool), the assembly device (joining device) and the assembly method (joining method), has advantages over the state of the art in terms of the accuracy of positioning, the reliability of the process and quality. In addition, improvements arise concerning the rapidity and economy of the joining technique.

The oblong component, especially a stringer, can be positioned, aligned and assembled better in relation to the flexible workpiece, especially a surface structure or a skin. The component may optionally be placed on the workpiece completely and at once.

The assembly may take place locally at a plurality of discrete and spaced-apart assembly points along the component simultaneously or consecutively. The respective area of the component gripped with the assembly tool can now be pressed at the assembly point for a predefined duration as well as with a defined force and heat supply to the workpiece. The pressing and the heat supply take place stationarily. The assembled connection, especially bonded connection, can be created hereby with accurate and reproducible parameters. The assembly process and the quality of the assembled connection are better and more continuous than with a rolling assembly tool.

The number, location and size of the assembly points are freely selectable, as a result of which the assembly process is flexible and can be adapted to any desired component and tool as well as to the requirements of such components and tools. The distance of the discrete and punctiform assembly points is also selectable. A larger assembly area can be created as needed by concentrating assembly points and arranging them at closely spaced locations. The assembly process with the discrete and spaced-apart assembly points is a type of tack assembly or tack bonding.

The component can be gripped with the assembly tool on its upper face and pressed against the workpiece located under it. The assembly tool can hold the component from the top with a lifting gripper, especially suction gripper, release it after forming the local assembled connection and change the grip to the next assembly point. A loss prevention device prevents the component from falling down in case of a possible failure of the lifting gripper.

The assembly tool grips an area of the component that is short in terms of length and presses same onto the workpiece at a closely limited assembly point. This is favorable for assembling components and workpieces that have a variable contour over their length, especially a curved shape, local projections, arches or the like.

The pressing on and the introduction of heat take place over an area via a pressing surface, which is adapted to the contour of the contacted area of the component. The pressing surface can be heated in a controlled manner, so that the amount of heat introduced at the assembly point can be accurately controlled. The force and heat introduction is distributed over a defined area, and a bonding point of a defined size and strength is formed at the local assembly point. Bilateral assembly points can be formed simultaneously in omega- or T-shaped components with bilateral, continuous or local flanges.

The assembly tool can guide, especially center the component during gripping with a positioning tool and possibly correct any deviations in the shape of the flexurally elastic component. The assembly force can be controlled and optionally regulated by means of a sensor device carried along. Further, the relative position in relation to the component can be detected. An external measuring device may be used for the accurate measurement and positioning of the component or components at the workpiece and for possibly correcting the position of the programmed industrial robot and the assembly tools thereof.

The assembly, preferably assembly in substance by bonding, welding or the like, of the component with the workpiece can be carried out with the assembly technique according to the present invention in the assembly and contact position assumed by the component at the workpiece. The assembly process may take place simultaneously by means of a plurality of industrial robots and assembly tools thereof at a plurality of assembly points distributed over the length of the component. This shortens and improves the assembly process. The assembly technique being claimed is possible for components of any length, and the advantage offered by the present invention in terms of quality is particularly manifest here.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
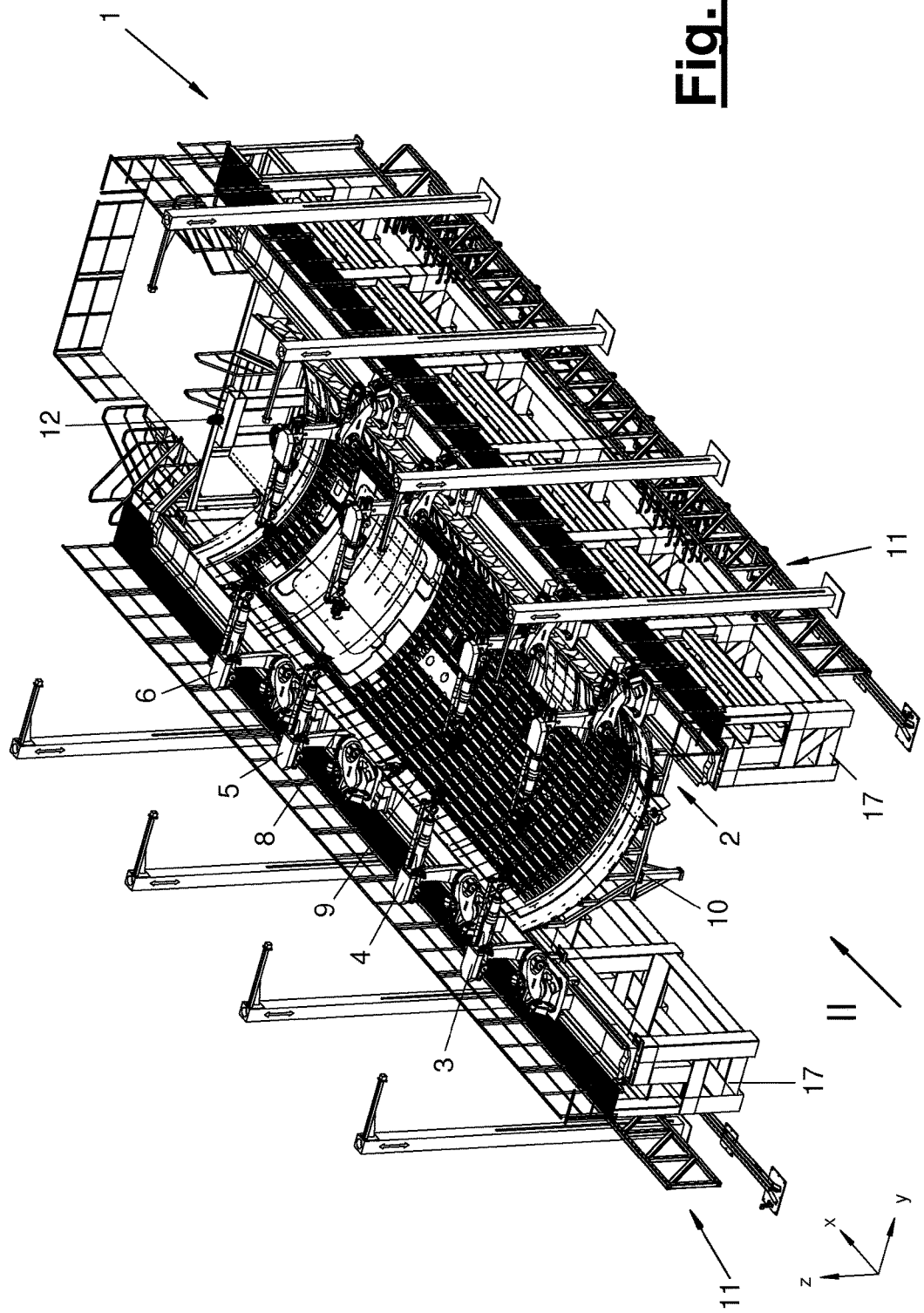
FIG. 1 is a perspective view of an assembly station with an assembly device.

Referring to the drawings, the present invention pertains to an assembly tool (7), to an assembly device (2) equipped therewith and to an assembly method for assembling components (9) on workpieces (8). The present invention pertains, in addition, to an assembly station (1) with at least one such assembly device (2) in a manufacturing plant.

Figure 2:
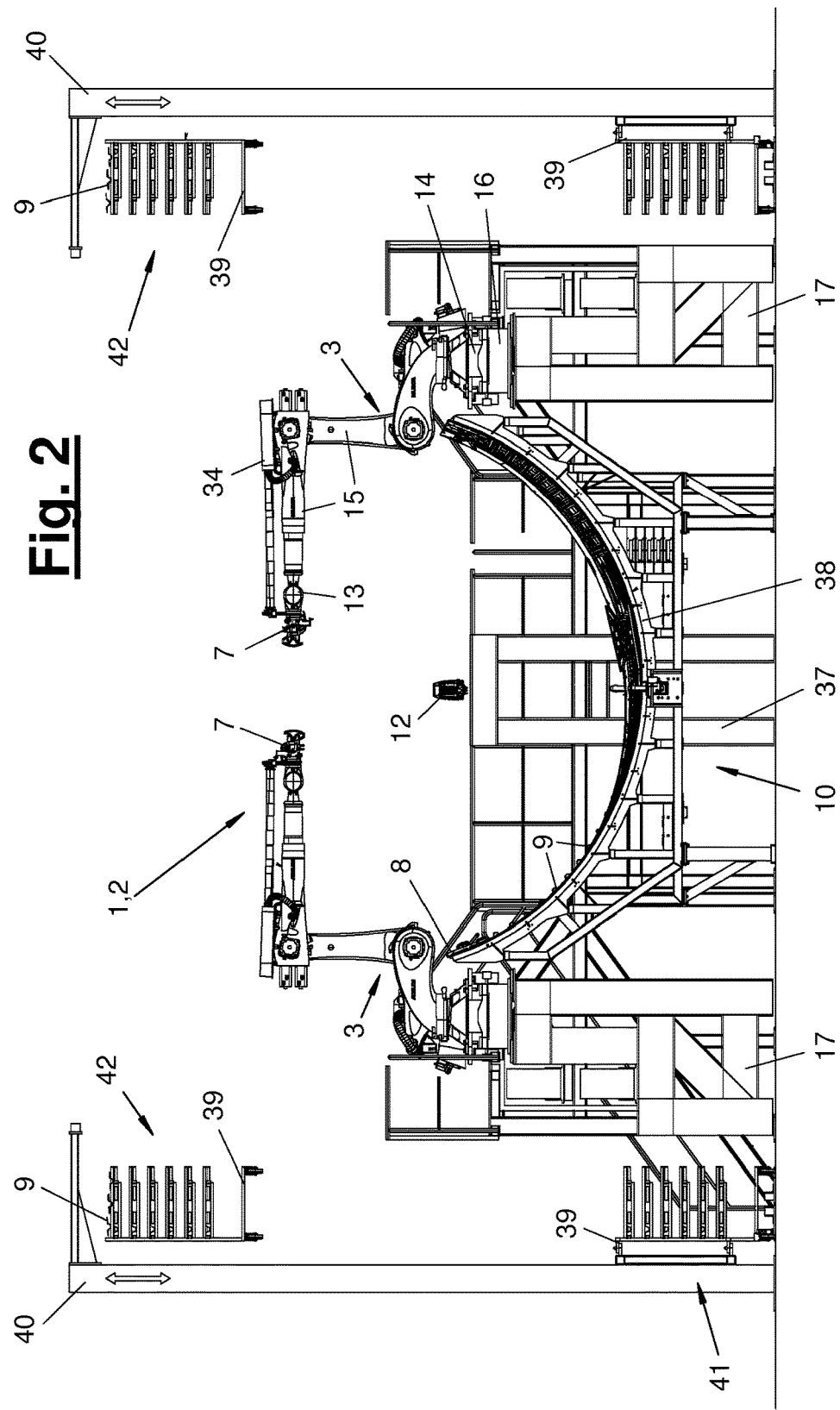
FIG. 2 is a front view of the assembly station according to arrow II in FIG. 1.

FIGS. 1 and 2 show an assembly device (2) and an assembly station (1). The assembly device (2) has a plurality of programmable industrial robots (3-6) with assembly tools (7). In addition, a component feed unit (11) and a workpiece holder (10) may be present. In addition, an external measuring device (12) may be present for the assembly process, which preferably measures in a contactless manner, especially optically and is configured, e.g., as a laser tracker. The assembly device (2) may have, in addition a sensor device (20). Further, a control, not shown, is present, to which the components of the assembly device (2) are connected. This may be, e.g., a robot control or an overarching control. The assembly device (2) is controlled by this according to preset programs.

The assembly device (2) is used to assemble oblong components (9) on flexible workpieces (8) with an accurate fit. The components (9) may have a stiffening function and are preferably so-called stringers. These are configured as elongated profiles, which have, e.g., an omega-shaped cross section according to FIGS. 5 through 7 or a T-shaped cross section (not shown). The components (9) or stringers may extend in a straight or bent shape and have a corresponding longitudinal axis (35). The profiles (9) have a middle elevated area and lateral flange areas for assembly. The elevated area may be, e.g., a roof-like arch of the profile in case of the omega profile or an upright web in the case of the T profile. The contact and joining area is always located on the underside of the flanges. The components (9), especially stringers, may consist of suitable materials, e.g., metal or plastic or composites. These may be materials that form a connection on heating, e.g., melt and bond or are welded together.

The flexible workpiece (8) is preferably a flexible surface structure, which can be used in aircraft manufacture, in the manufacture of vehicles or in other areas. It may form a skin (so-called skin in English) or a component of the skin of an aircraft part, e.g., of the fuselage of the aircraft, of a wing or the like.

The workpiece (8) has, e.g., a thin-walled and multilayer configuration and is configured as a composite part, especially as a carbon fiber laminate part. The workpiece layers may have a structure reinforced by fibers or the like and impregnated with a liquid or paste-like bonding agent, by means of which the workpiece layers are then also intimately bonded to one another in a curing process or the like. The bonding agent may be especially a hot-curing synthetic resin.

The component (9) and the workpiece (8) form a melted or bonded connection with one another during assembly due to the supply of heat. For example, one or both partners (8, 9) or possibly an intermediate layer may melt in the process.

The workpiece (8) preferably has the shape of a shell and is held, shaped and supported by a workpiece holder (10) for the assembly operation. The workpiece holder (10) may be part of the assembly device (2) and supplied with it as standard equipment. The workpiece holder (10) has a shell-shaped workpiece mount (38), which determines the shape of the workpiece (8). The workpiece mount (38) preferably has a concave configuration and faces with its opening upward according to FIGS. 1 and 2. The shell shape of the workpiece mount (38) and of the workpiece (8) may be rounded. The inner side rand the outer side of the workpiece (8) may have smooth surfaces.

According to FIGS. 1 and 2, the workpiece (8) may have a constant or variable shape in space in its longitudinal extension along the x axis shown, e.g., in the form of a bulge or taper. The component (9) or the stringer follows this change in shape. The flexible workpiece (8) may have a flat and mat-like shape in the starting position, and it will assume the shell shape desired for the final state in the workpiece mount (38).

The workpiece holder (10) may have a stationary frame (37), e.g., the subframe shown with the workpiece mount (38) arranged thereon. A nonstationary frame (37), especially a subframe, may be moved by a conveying means movable along one axis or a plurality of axes through the different stations of a manufacturing plant.

According to FIGS. 1 and 2, one or more oblong components (9), especially stringers, are assembled on the broad surface, especially the inner surface, of the workpiece (8). The components (9) extend here along the straight or bent surface of the workpiece (8).

A component feed unit (11), which is shown in FIGS. 1 and 2 and is arranged, e.g., laterally next to the workpiece holder (10), may be provided for one or more components (9). The component feed unit (11) has a stationary or nonstationary magazine (39), especially a workpiece rack, for a plurality of components (9) and a feeding device (40). The feeding device (40) lifts off, e.g., the magazine (39) from a lower loading position (41) on a conveyor and brings it into an upper readiness position (42) suitable for transfer above the workpiece holder (10). The feeding device (40) may be configured, e.g., as a lifting gripper.

The one or more components (9) are positioned against the workpiece (8) kept ready during the assembly operation and are aligned as well as subsequently assembled. The assembly process is preferably an assembly in substance, especially bonding or welding. In the preferred embodiment shown, heat is introduced into the component (9) and/or the workpiece (8) locally and under a pressing pressure over a defined pressing time. As an alternative, cold assembly may be performed, in which case an adhesive or another suitable adhesive agent or bonding agent is used.

Figure 3:
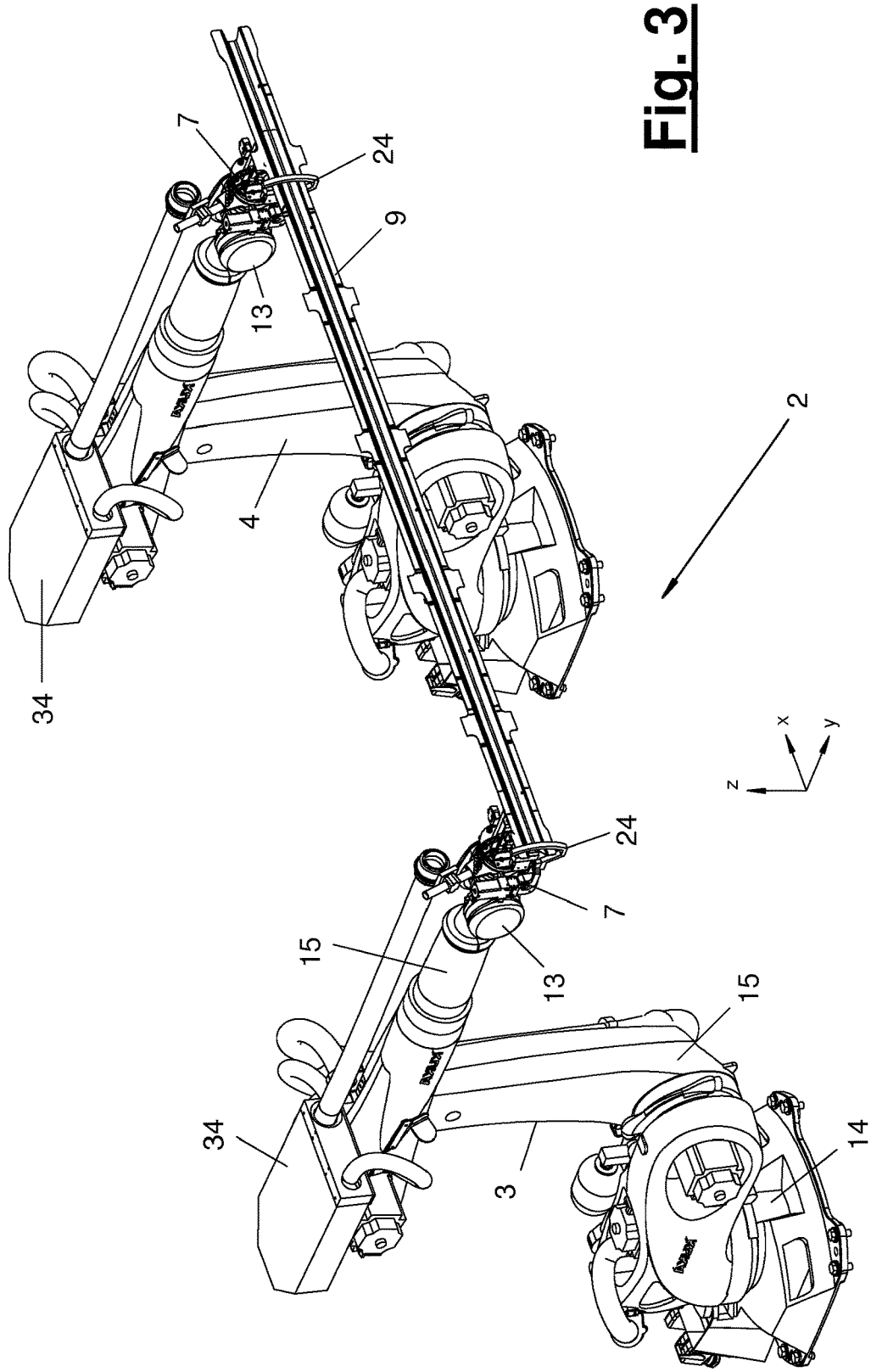
FIG. 3 is a perspective view showing a variant of an assembly device with a plurality of industrial robots and with assembly tools.
Figure 4:
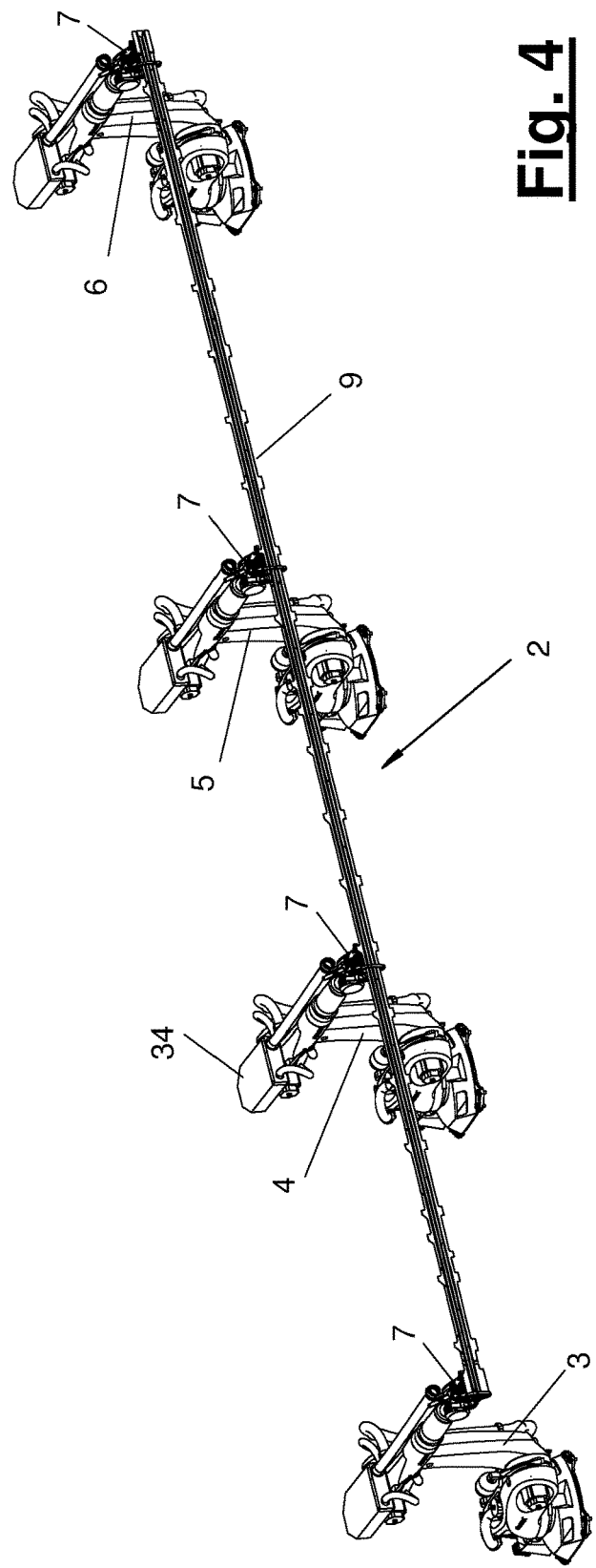
FIG. 4 is a perspective view showing another variant of an assembly device with a plurality of industrial robots and with assembly tools.

The assembly device (2) has two or more industrial robots (3-6), which together grip and assemble a component (9) on the workpiece (8) with their assembly tools (7). According to FIG. 3, at least two industrial robots (3, 4) arranged in a row and at spaced locations from one another are present. Their number may also be higher as desired, e.g., three, four or more. FIGS. 1, 2 and 4 show an assembly device (2) with four industrial robots (3-6).

Two such assembly devices (3) as well as industrial robots (3-6) arranged in a row are arranged and aligned in the assembly station (1) on both sides and along the x axis of the workpiece holder (10) and of the workpiece (8) mounted there. Only one or more than two such assembly devices (2) may be present in other embodiments.

The industrial robots (3-6) are multiaxial robots and have any desired number and combination of rotatory and/or translatory robot axes. In the preferred embodiments shown, they are configured as articulated arm robots or bent-arm robots with rotatory robot axes. They have, e.g., five or six rotatory robot axes. The industrial robots (3-6) have, e.g., a base (14) with a rotatable pedestal and two robot arms (15) pivotably connected to the base (14) and to one another as well as with a driven link (13), which is configured, e.g., as a robot hand with two or three rotatory axes and carries the assembly tool (7).

The industrial robots (3-6) may have an additional motion axis (16). This may be, e.g., a travel axis, which extends along the workpiece holder (10) or said x axis. The industrial robots (3-6) are preferably arranged upright. Together with their additional motion axis (16), they may be arranged on a substructure (17) on one of the two of the workpiece holders (10) in an elevated position and above the workpiece (8). In another variant, a portal extending over the workpiece holder (10) and the mounted workpiece (8) may also be provided with one or more industrial robots arranged in a suspended manner.

The readiness position (42) for the magazine (39) and the components (9) or stringers arranged therein is always located in the working range of the industrial robots (3-6) of an assembly device (2). The industrial robots (3-6) lined up can remove a component (9) there with their assembly tools (7) together and feed it to the workpiece (8).

Figure 5:
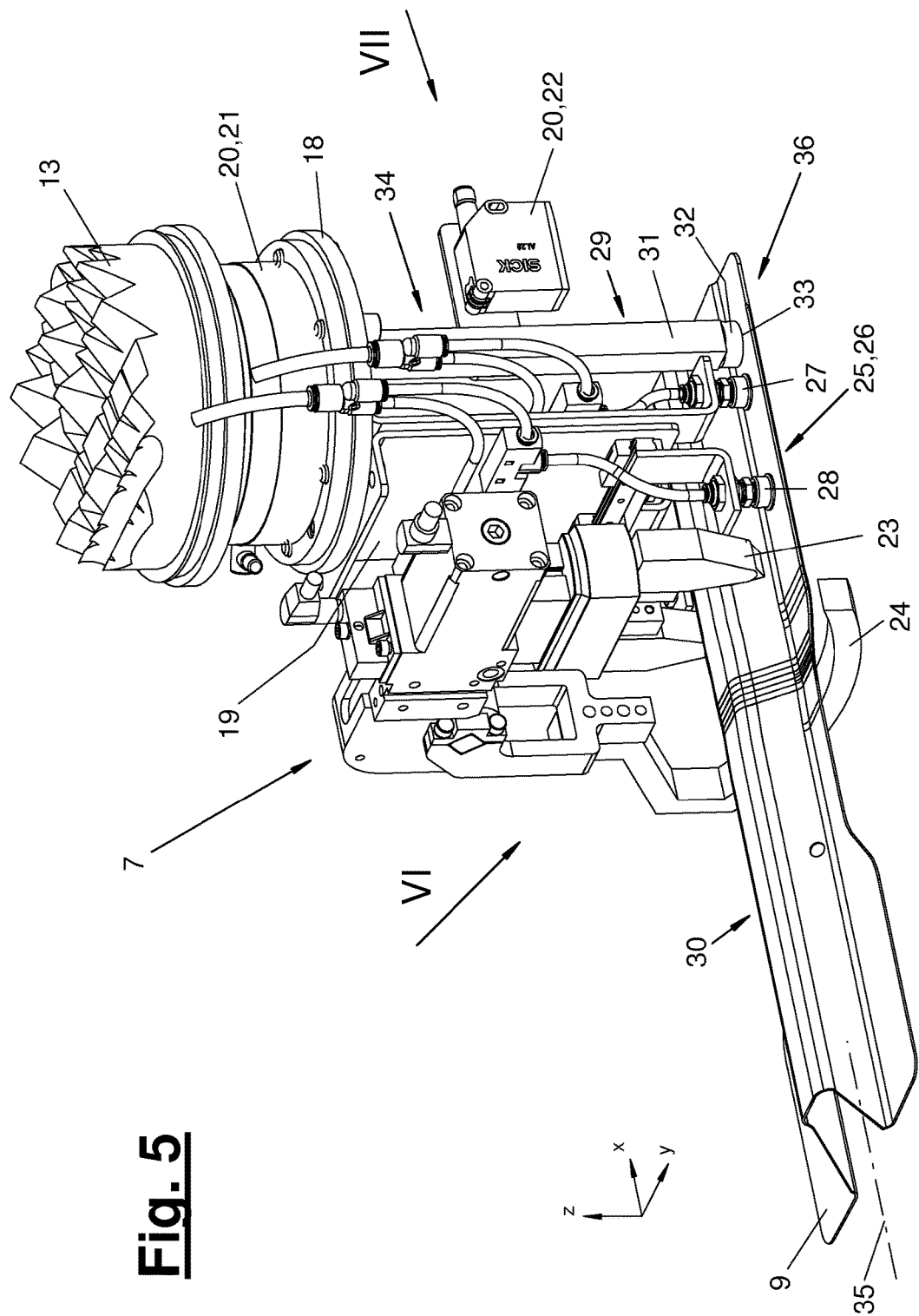
FIG. 5 is a perspective view showing an assembly tool.
Figure 6:
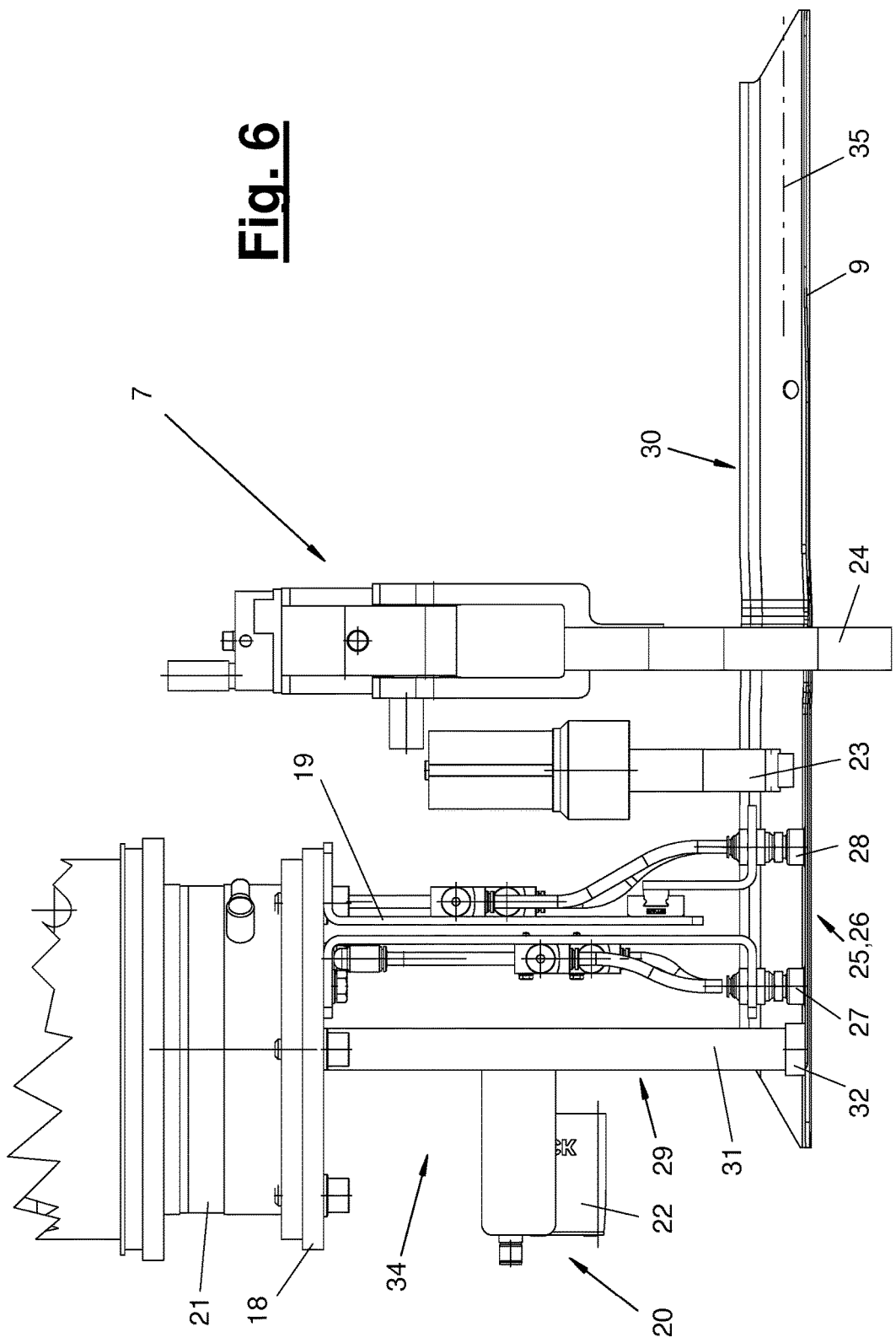
FIG. 6 is a side view showing an assembly tool.
Figure 7:
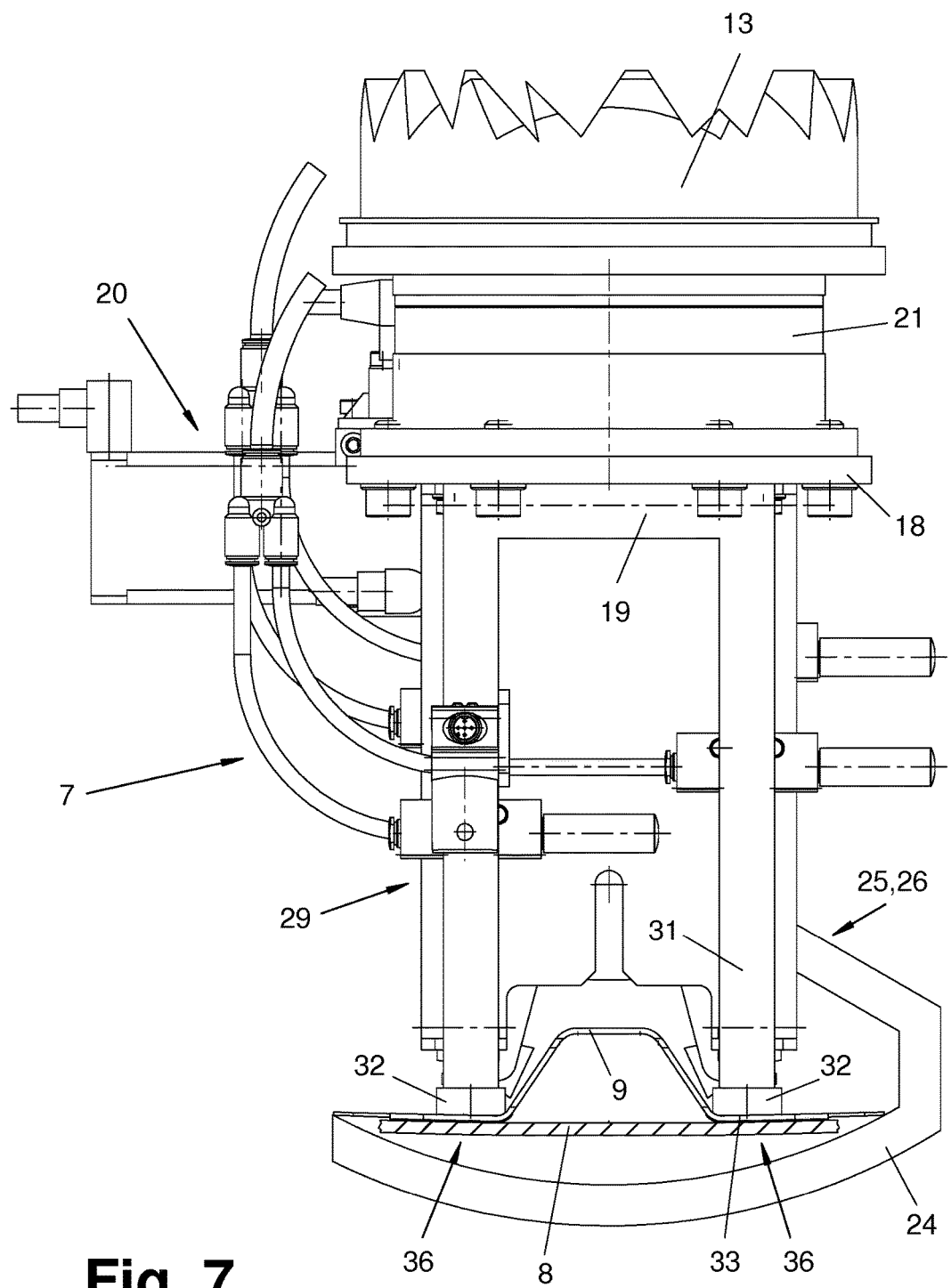
FIG. 7 is an end view showing an assembly tool.

FIGS. 5-7 show a preferred embodiment of the assembly tool (7). FIGS. 6 and 7 show the side view and front view of the assembly tool (7) corresponding to the arrows VI and VII from the perspective view shown in FIG. 5.

The assembly tool (7) has a frame (19) with a connection (18) for connection to the driven link (13) of an industrial robot (3-6). An automatic change coupling may be arranged between the connection (18) and the driven link (13).

The assembly tool (7) has, further, a gripping tool (25), a counterholder (29) and a positioning tool (23) for a component (9). In addition, a loss prevention device (24) may be present, which prevents the component (9) from becoming separated from the assembly tool (7), especially from falling off, in case of failure of the gripping tool (25). The above-mentioned components (23, 24, 25, 29) are likewise arranged on the frame (19). Only parts of the frame (19) are shown in FIGS. 5 through 7 for clarity's sake.

The gripping tool (25) acts on the upper face (30) of the component (9). The upper face (30) of the component is located opposite the assembly side of the component (9) and the contact and assembly surfaces arranged, e.g., on the underside of the bilateral flanges of the component. The component (9) and the assembly tool (7) have a longitudinal direction and a central longitudinal axis (35). It extends along the x axis in the assembly position.

The counterholder (29) is arranged in the longitudinal direction (35) next to the gripping tool (25) and in close vicinity hereto. The positioning tool (23) is likewise arranged in the longitudinal direction (35) next to the gripping tool (25) in close proximity. In the preferred embodiment shown, the gripping tool (25) is located between the counterholder (29) and the positioning tool (23). As an alternative, the gripping tool (25) many be arranged on both sides of the counterholder (29).

The gripping tool (25) is configured as a controllable lifting gripper (26), which acts on the upper face (30) of the component and holds the component (9) from above and on the upper face (30) and pulls it at the same time against the counterholder (29) and brings it into contact with same. The lifting gripper (26) is configured as a suction gripper in the preferred embodiment. It has a plurality of suction elements (27, 28), which are arranged one after another in the longitudinal direction. The suction elements (27, 28) may also be located on both sides of the longitudinal axis (35) and act each on a flange of the component.

In the embodiment shown, the suction elements (27, 28) are located between the counterholder (29) and the positioning tool (23). The counterholder (29) may be arranged between the suction elements (27, 28) in the above-mentioned variant.

The one suction element (27), which is located, e.g., adjacent to the suction element (27), may have a fixed arrangement on the frame (19). It also has a fixed local association in relation to the counterholder (29), so that the component (9) picked up by suction and the respective component flange is sucked against the counterholder (29) with the upper face (30) and brought into contact. The other suction element (28), which is located at a spaced location in the longitudinal direction (35), may be arranged on the frame (19) especially floatingly such that it is movable laterally or at right angles to the longitudinal axis (35).

The lifting gripper or suction gripper (26) is controllable and can be connected to the above-mentioned control. Operating materials, especially compressed air, electric signal or power current or the like, can be fed to the lifting or suction gripper (26) via corresponding lines from the industrial robot (3-6), optionally via a change coupling, or by means of a separate external feed unit.

The positioning tool (23) ensures accurate positioning of the component (9) relative to the assembly tool (7) and at right angles to the longitudinal axis (35). This is, for example, the y axis shown in FIG. 1, with the longitudinal axis (35) extending in the direction of the x axis.

The positioning tool (23) is likewise controllable and is connected to said control. It can be opened and closed. In the exemplary embodiment shown, the positioning tool (23) is configured as a parallel clamp with two clamping jaws, which act from above on the elevated area (omega arch or T web) of the component (9) on both sides and have contact surfaces with a shape adapted to the contour of the component. The positioning tool (23) centers the component (9) to be gripped to the central longitudinal axis (35) of the assembly tool (7).

The component (9) is sucked first only with the suction element (28) or with the suction elements (28) movable crosswise. The positioning tool (23), which centers the component (9) to the longitudinal axis (35), is subsequently activated, and the suction element or the suction elements (28) optionally evade or follow laterally. The fixed suction element (27) or the fixed suction elements (27) are subsequently switched on, and the centered component (9) is firmly gripped and fixed at the assembly tool (7).

This procedure is especially advantageous if the components (9) or stringers are located inverted (opening and component flanges facing upward) in the component magazine (39) and are lifted out upwardly from the bottom. Due to the initial gripping or suction, the component cannot escape upwardly in an undesired manner when the positioning tool (23) is closed, especially if it has oblique profile walls or profile legs in case of an omega shape.

When centering an "ideally" straight component (9), positioning takes place via the center or longitudinal axis (35), i.e., in the correct position. This operation takes place when the component (9) is picked up for the first time simultaneously at all pick-up points. A possibly "twisted" component (resulting, e.g., from stresses in the component) is correspondingly "bent" into its correct shape.

The counterholder (29) is heated and it likewise acts on the upper face (30) of the component and preferably on both flanges of the component. The counterholder (29) has a compression-proof and rigid configuration. It is used to oppress the component (9), especially the acted-on flanges of the component, onto the workpiece (8). The counterholder (29) is used, in addition, to introduce the energy necessary for the assembly operation.

In the exemplary embodiments shown, this is thermal energy, which is introduced, e.g., by contacting heat conduction from the counterholder (29) into the area of the component that is in contact with it and farther to the subjacent contact and assembly areas to the component (9). As an alternative, remote heating with contactless heat transmission is possible.

The amount of energy or heat can be controlled and led to plasticization, especially partial melting of the component (9) and/or of the workpiece (8) in the contact and assembly area. In one variant, a plasticizable, especially meltable intermediate layer may have been inserted between the parts (8, 9).

The aforementioned assembly point (36) is located in the area in which force and heat are introduced by the counterholder (29) into the component (9) and workpiece (8).

The counterholder (29) is configured as a pressure ram (31), which carries a heatable pressing head (32) with a pressing surface (33), with which it comes flatly into contact with and acts on the component (9). The pressure ram (31) has, e.g., a rigid configuration and is arranged rigidly. It may have a yoke-like shape. It may carry one or more, e.g., two pressing heads (32). In the preferred embodiment shown, there are two pressing heads (32), which are intended for one component flange each.

The pressing surfaces (33) may have any desired cross-sectional shape. They preferably have a round or oval configuration. The pressing surface (33) is always adapted to the contour of the contacted areas of the component. It has, e.g., a correspondingly flat shape for the component flanges, which are flat on the upper face (30). If the component (9), especially the component flanges, should have a profiling with projections and/or with depressions on the upper face (30), the pressing surface (33) has a corresponding, especially complementary contour and profile.

The pressing head (32) is configured as a controllable heating element or has an integrated, controllable heating element. The heating element may generate heat, which is transmitted to the component (9) and/or workpiece (8) by contact or in a contactless manner, in any desired and suitable manner. It is configured, e.g., as an electric heating element. The heating element, which is optionally present as a plurality of heating elements, is part of a heating device (34), whose additional components are arranged at the assembly tool (7) or optionally at another location, especially at the associated industrial robot (3-6). A common heating element (34) may also be provided for a plurality of assembly tools (7).

The heating device (34) has a suitable energy supply and a control as well as a sensor system for measuring the temperature and/or the amount of heat. The heating device (34) is controllable and is likewise connected to said control. The amount of heat introduced at the assembly point (36) can be controlled and optionally also regulated.

The loss prevention device (24) may be arranged at any desired and suitable location of the assembly tool (7). It is preferably combined with the positioning tool (23) or is arranged next to it at a closely spaced location. The assembly tool (7) has a close arrangement of the components and a compact type of construction in the longitudinal direction (35). The loss prevention device (24) is configured, e.g., as a controllable undergrip clamp, whose tensioning arm reaches under the component (9) in the closed position and is pivoted away into an inoperative position for feeding and assembling the gripped component (9).

The assembly of a component (9) on a workpiece (8) may take place in different ways. In one variant, the two or more industrial robots (3-6) can align the component (9) gripped by them together prior to the assembly in parallel and equidistantly from the workpiece (8) and then press it together and simultaneously onto the workpiece (8) for assembly and heat at the assembly points (36). The number of assembly points (36) corresponds here to the number of industrial robots (3-6) and of the assembly tools (7). If a larger number of assembly points (36) is needed, one or more industrial robots (3-6) can open their assembly tool (7) after completion of the first assembly operation, become detached from the component (9) and move to another point of the component, grip there and press on and heat again. The displacing motion of the assembly tool (7) along the longitudinal direction (35) of the component (9) can be brought about by means of a robot axis or by means of the travel axis (16).

In another variant, the assembly with feeding, pressing on and heating of the gripped component (9) may take place in a rolling manner. For example, the industrial robot (3) with its assembly tool (7) can grip the component (9) at one end, feed it to the workpiece (8) and press it on and heat it to form an end-side assembly point (36) in the variant of the assembly device (2) shown in FIG. 3. The other industrial robot (4) now holds with its assembly tool (7) the other end area of the workpiece (9) in a floating position located at a spaced location from the workpiece (8). After forming the first assembly point (36), the industrial robot (3) releases the component (9), grips around and grips the component at another location, which is still at a distance from the workpiece (8), and assembles it to form the next assembly point (36). This operation maybe repeated several times, while the other industrial robot (4) brings the component (9) closer to the workpiece (8), optionally step by step.

The assembly operation in which the tacking is performed in a rolling manner may also be carried out with a larger number of industrial robots (3-6) according to FIG. 4.

In the assembly process shown and described, the component (9) shall be positioned exactly at the workpiece (8). An external and preferably stationary measuring device (12) and, at the industrial robots (3-6), especially at the assembly tools (7) thereof, a carried-along sensor device (20) are present for this purpose. The measuring device (12) and the sensor device (20) are connected to said control.

The external measuring device (12) is arranged, e.g., according to FIGS. 1 and 2, centrally and stationarily. It measures the position of the components (9) and optionally also of the assembly tools (7), especially of the positioning tools (23) thereof in space and relative to the workpiece (8). Any positioning and/or alignment errors of an industrial robot (3-6) and of an assembly tool (7) thereof can thus be detected and corrected by means of the control. The component (9) can be gripped as a result with the assembly tool (7) in the predefined desired position and subsequently fed to the workpiece (8) and pressed on.

During assembly, the industrial robot (3-6) presses the counterholder (29) of the assembly tool (7) and the gripped component (9) onto the workpiece (8) with a defined, especially controllable or regulatable force. The sensor device (20) carried along is used to control and possibly regulate the assembly process.

The sensor device (20) carried along may have one or more sensors (21, 22). Such a sensor may be a sensor (21) picking up mechanical loads, with which the pressing force of the industrial robot (3-6), which force acts during assembly, can be detected in one or more axes, preferably in all six space axes. The sensor (21) may be configured, e.g., as a 6D force sensor or as a force-momentum system. It is associated with the assembly tool (7) and may be located at a suitable location in the flow of forces.

For example, it is arranged between the connection (18) and the driven link (13) or the change coupling. Such a sensor (21) may be integrated in the assembly tool (7) in another variant. Further, it is possible to use a tactile industrial robot with an integrated sensor system arranged on the robot axes, which picks up the externally acting loads, especially moments.

Another sensor (22) may be used to detect the position of the component (9) and/or assembly tool (7). It is present as a single sensor or as a plurality of sensors and is arranged, e.g., on the frame (19) and in the axial proximity of the counterholder (29) as well as floatingly at a spaced location above the gripped component (9). It has a defined position in relation to the counterholder (29) and preferably detects the component (9) and/or the workpiece (8) in a contactless manner, especially optically.

It may be designed, e.g., as a distance sensor, which measures the distance from the component (9) optically by means of laser beam or in another manner, e.g., inductively or capacitively. A an alternative or in addition, it may be configured as an edge-scanning sensor, which is arranged at the edge of the assembly tool (7) and is directed towards the end-face edge of the component (9) and optionally of the workpiece (8). Such a sensor (22) may be configured, e.g., as a laser sensor.

The position sensor (22) can detect especially the free end of the component (9) for forming the first end-side assembly point (36) in the correct position. On the other hand, it may also detect the edge or the axial end of the workpiece (8) in order to establish the correct axial relative position of the component (9) and workpiece (8) for the assembly. FIG. 3 shows the industrial robot (3) with the end of the component gripped in the correct position.

The absolutely accurately located assembly device (2) can be adapted with the measuring device (12) and the sensor device (20) to the actual position and the actual alignment of the workpiece (8) and of the gripped component (9) and adjusted in case of deviations. Accurate positioning, alignment and feeding of the component (9) to the workpiece (8) is possible based on this.

Different variants of the exemplary embodiments shown and described are possible. In particular, the features of these exemplary embodiments can be combined with one another and especially transposed as desired.

The assembly device (2) may have other actuators or handling devices movable along one axis or a plurality of axes instead of the preferred industrial robots (3-6) shown. The assembled connection may be carried out according to another physical method and with the use of other forms of energy. For example, it is possible to work with electrical or electromagnetic fields, especially alternating fields, with radiant energy or the like.

In addition, the assembly device and the assembly method may be used and adapted in other technical areas. This may be, e.g., the manufacture of vehicle bodyshells or vehicle bodies, especially truck bodies. In addition, the component (9) and the workpiece (8) may have another shape and consist of other materials. Specially prepared assembly points, e.g., local platforms, may be formed on the component (9) and/or on the workpiece (8). Further, the assembly device (2) may prepare the assembly points provided on the workpiece (8) and/or on the component (9) in advance, e.g., by introducing heat and/or applying an adhesive or bonding agent or in another manner.

While specific embodiments of the invention have been shown and described in detail to illustrate the application of the principles of the invention, it will be understood that the invention may be embodied otherwise without departing from such principles.

The invention claimed is:

1. A joining tool for joining oblong components on flexible workpieces with a correct fit, wherein the joining tool is heatable, the joining tool comprising:
    a connection for an industrial robot; and
    a gripping tool for gripping a component with a controllable lifting gripper acting on an upper face of the component, and a heated counterholder arranged next to the controllable lifting gripper, which likewise acts on the upper face of the component, wherein the controllable lifting gripper is a suction gripper and is configured to hold the component from above the component and to act on a component upper face and to pull the component against the counterholder and to bring the component into stationary surface contact with the counterholder.

2. A joining tool in accordance with claim 1, wherein the counterholder is configured as a pressure ram with a heated pressing head, which has a pressing surface adapted to the contour of the contacted areas of the component.

3. A joining tool in accordance with claim 2, wherein the pressure ram has a rigid configuration and is arranged rigidly.

4. A joining tool in accordance with claim 2, wherein the pressing head is configured as a controllable heating element or has an integrated, controllable heating element.

5. A joining tool in accordance with claim 1, wherein the suction gripper comprises a plurality of suction elements arranged one after another in a longitudinal direction of the component to be gripped and one of the suction elements is arranged in a fixed manner and another of the suction elements is arranged laterally or at right angles to the longitudinal direction.

6. A joining tool in accordance with claim 1, wherein the counterholder comprises a plurality of pressing heads and the suction gripper comprises a plurality of suction elements, which are arranged in pairs and at spaced locations on both sides of a central longitudinal axis.

7. A joining tool in accordance with claim 1, further comprising a positioning tool, for positioning the component to be gripped.

8. A joining device for joining oblong components on flexible workpieces with a correct fit during a joining process, wherein the joining device comprises a plurality of industrial robots with joining tools for handling and joining the component together, wherein at least one of the joining tools comprises:

a connection for one of the industrial robots; and a gripping tool for gripping a component with a controllable lifting gripper acting on an upper face of the component, and a heated counterholder arranged next to the controllable lifting gripper, which likewise acts on the upper face of the component, wherein the controllable lifting gripper is a suction gripper and is configured to hold the component from above the component and to act on a component upper face and to pull the component against the counterholder and to bring the component into stationary surface contact with the counterholder.

9. A joining device in accordance with claim 8, wherein the industrial robots are configured and controlled such that the industrial robots align the component prior to the joining in parallel and equidistantly to the workpiece and then together press the component onto the workpiece and heat the component and at least one of the industrial robots is configured and controlled such that the at least one of the industrial robots joins the component at a plurality of joining points one after another and changes the grip on the component in the process.

10. A joining device in accordance with claim 8, further comprising a sensor device.

11. A joining device in accordance with claim 8, wherein an at least one of the industrial robots is arranged upright on a substructure or suspended on a portal.

12. A joining device in accordance with claim 8, wherein the joining device has an external measuring device comprising a laser tracker, measuring the joining process.

13. A method for joining oblong components on flexible workpieces with a correct fit, the method comprising the steps of:

providing a joining device, which has a plurality of industrial robots with joining tools for handling and joining, wherein at least one of the joining tools comprises: a connection for one of the industrial robots; a gripping tool for gripping a component with a controllable lifting gripper acting on an upper face of the component; and a heated counterholder arranged next to the controllable lifting gripper, which likewise acts on the upper face of the component;

heating, with the at least one of the joining tools, and griping the component with a gripping tool, wherein the gripping tool acts on the component on an upper face of the component with a controllable lifting gripper, and acts on the upper face of the component with a heated counterholder arranged next to the controllable lifting gripper, wherein the controllable lifting gripper is a suction gripper and is configured to hold the component from above the component and to act on a component upper face and to pull the component against the counterholder and to bring the component into stationary surface contact with the counterholder.

14. A method in accordance with claim 13, wherein the industrial robots align the component prior to the joining in parallel and equidistantly from the workpiece and then press the component together onto the workpiece for joining and heating the component.

15. A method in accordance with claim 13, wherein a plurality of industrial robots first hold the component floatingly and then press the component in a sequence one after another onto the workpiece and assemble the component at some points.

16. A method in accordance with claim 13, wherein an industrial robot joins the component at a plurality of joining points one after another and changes the grip on the component in the process.

17. A method in accordance with claim 13, wherein the position, especially the axial position, of the gripped component relative to the workpiece or to a workpiece holder or in the gripping tool is detected with a sensor at the joining tool.

18. A method in accordance with claim 13, wherein the position of the components and also of the joining tools, in space and relative to the workpiece is measured with an external measuring device comprising a laser tracker.

19. A method in accordance with claim 18, wherein any positioning and/or alignment errors of an industrial robot and of the joining tool thereof can be detected with the external measuring device and corrected via the control, wherein the component is gripped in the predefined desired position with the joining tool and subsequently fed to the workpiece and pressed on.

20. A method in accordance with claim 13, wherein the industrial robot presses the counterholder of the joining tool and the gripped component onto the workpiece with a defined, controllable or regulatable force during the joining.

* * * * *